United States Patent [19]

Magosch et al.

[11] 4,104,261
[45] Aug. 1, 1978

[54] LOW PILLING POLYESTER FIBERS AND PROCESS FOR THEIR MANUFACTURE

[75] Inventors: Karl-Heinz Magosch; Roland Feinauer; Jörn Rüter, all of Marl, Fed. Rep. of Germany

[73] Assignee: Chemische Werke Huls, AG, Marl, Fed. Rep. of Germany

[21] Appl. No.: 760,924

[22] Filed: Jan. 21, 1977

Related U.S. Application Data

[63] Continuation-in-part of Ser. No. 536,988, Dec. 27, 1974, abandoned.

[30] Foreign Application Priority Data

Jan. 17, 1974 [DE] Fed. Rep. of Germany ....... 2402035

[51] Int. Cl.² .............................................. C08G 63/22
[52] U.S. Cl. .................................. 260/873; 260/862; 260/878 R; 260/885
[58] Field of Search .................. 260/75 R, 75 T, 862, 260/873, 878 R, 885

[56] References Cited

U.S. PATENT DOCUMENTS

| 3,290,411 | 12/1966 | Tsuji et al. ............................ 260/873 |
| 3,591,659 | 7/1971 | Brinkmann et al. .................. 260/873 |

*Primary Examiner*—Lucille M. Phynes
*Attorney, Agent, or Firm*—Gilbert L. Wells

[57] ABSTRACT

An improvement in the process of melt spinning ethylene terephthalate polyester to produce textile fibers with decreased pilling in the threads, fibers or fabrics made therefrom. The ethylene terephthalate is melt polymerized in the presence of a condensation catalyst to a final temperature of about 250°–300° C and a final pressure of less than 10 mm mercury to form an anhydrous melt. A vinyl copolymer having more than two carboxyl and/or hydroxyl groups is added to the melt polymerization at a concentration of about 0.005 to 2.0 percent referred to the dicarboxylic acid component. Melt spinning of the modified polyester is then carried out. The vinyl copolymer has the following general formula-where $n$ is an integer from 10 to 10,000;
$a$ is zero or an integer from 1 to 100;
$b$ is an integer from 1 to 100;
$R^1$ through $R^6$ are hydrogen, an alkyl group with 1 to 3 carbon atoms or an oxalkyl group $-OR^7$;
$R^7$ is an alkyl group with 1 to 6 carbon atoms or an aryl group with 6 to 10 carbon atoms;
$X_1$ is hydrogen, an alkyl group with 1 to 3 carbon atoms, or a carboxyl group, an esterified carboxyl group; and
$X_2$ is a carboxyl group, a hydroxyl group, an esterified carboxyl group or an esterified hydroxyl group.

3 Claims, No Drawings

LOW PILLING POLYESTER FIBERS AND PROCESS FOR THEIR MANUFACTURE

CROSS REFERENCES TO RELATED APPLICATIONS

The present application is a continuation-in-part of application Ser. No. 536,988 filed Dec. 27, 1974, now abandoned.

Applicants claim priority under 35 USC 119 for application P 24 02 035.7, filed Jan. 17, 1974 in the Patent Office of the Federal Republic of Germany.

The disclosure of applicants' copending application Ser. No. 495,074, filed Aug. 5, 1974, now U.S. Pat. No. 3,953,405 is incorporated herein to show the state of the art of preparing low pilling effect polyester fiber products by adding a substituted cyclobutanedicarboxylic acid to the ethylene terephthalate melt.

The disclosure of applicants' copending application Ser. No. 536,987, filed Dec. 27, 1974, now U.S. Pat. No. 3,960,686 and entitled "Improved Method for Preparing Low Pilling Effect Polyester Fiber Products" is incorporated herein to show the state of the art of preparing low pilling effect polyester fiber products by adding a substituted cyclobutanedimethanol to the ethylene terephthalate melt.

BACKGROUND OF THE INVENTION

The field of the invention is synthetic resins from polyhydric alcohol-polycarboxylic acid reaction products. The invention is particularly related to a process for the manufacture of low pilling effect polyester fiber products.

The state of the art of the present invention may be ascertained by reference to the Kirk-Othmer "Encyclopedia of Chemical Technology", Vol. 16 (1968), pages 143–159, under the section entitled "Polyester Fibers"; U.S. Pat. No. 2,465,319 which shows the preparation of polyethylene terephthalate; U.S. Pat. No. 3,391,123 of Stedley, which issued July 2, 1968 and shows the state of the art of improving the pilling effect of polyethylene and shows the state of the art of improving the pilling effect of polyethylene terephthalate textile fibers; the Herman Mark et al "Encyclopedia of Polymer Science and Technology", Vol. 1 (1964) under the section "Acids, Maleic and Fumaric", pp. 67–95, particularly pp. 76–84 concerning copolymerization, Vol. 1 (1964) under the section "Acrylic Acid Polymers", pp. 197–226, particularly pp. 204–206 concerning copolymerization, Vol. 1 (1964) under the section "Acrylic Ester Polymers", particularly pages 263 and 264, and Vol. 14 (1971) under the section "Vinyl Alcohol Polymers", pp. 149–234, particularly p. 180 concerning copolymerization preferred for use in the present invention, the disclosures of which are incorporated herein.

On account of the great many outstanding properties such as high melting point, resistance to chemicals, heat, hot water and light, and because of their mechanical properties, yarns and fibers made from polyethylene terephthalate have achieved large significance in the textile and garment industries.

However, besides their numerous advantages, polyester fibers also suffer from drawbacks. One of these is the so-called pilling effect. It is caused by fibers being pulled out of the fabric during wear and twisting into small spheres firmly anchored in the fabric. The fabric surface thereby assumes an unpleasant appearance, and the quality of the garments is thereby degraded.

There have been many attempts to remedy this drawback of the polyesters by a variety of measures. The most frequently applied method consists in decreasing the polyester molecular weight and in thus obtaining correspondingly reduced relative specific viscosities (hereafter abbreviated as RSV) of about 0.35 to 0.45 dl/gm (deciliters per gram as measured at a concentration of 0.23 g in 100 ml phenol tetrachloroethane 60/40 at 25° C), whereby one obtains lesser yarn strength as disclosed in Japanese Application No. 24, 932/65. However, appreciably difficulties are caused when such material is melt spun, because of the very low viscosity of the melt.

Another possibility of preparing low pilling polyesters comprises the use of monomeric compounds with three or more functional groups, for instance such polyols as glycerin, such polyacids as trimesic acid, such polyphenols as phloroglucine, or such amino compounds as diethanolamine, as disclosed in German Offenlegungschrift No. 1,928,436. Partially branched polyester fibers are obtained in this manner, which compared with their molecular weight, are of higher melt viscosity than is the case for substantially linear products.

Again, repeated attempts were made to post-facto chemically degrade polyester fibers and fabrics made therefrom, by treating them at elevated temperatures with water, soda, ammonium, hydrazine, amines, carboxylic acids or alcohols, as disclosed in Czech Pat. No. 108,689; Dutch Pat. No. 91, 330; French Pat. No. 1,551,050; Japanese Pat. No. 7,122,174; and German Auslegeschrift No. 1,024,482. It was found, however, that such degradation can be controlled only with difficulty and is difficult to reproduce. In many instances attempts were made to generate weak spots in the molecule, which also may lead to branching or reticulation, by building in chain links with hetero-atoms, especially silicon, as disclosed in U.S. Pat. No. 3,335,211, and German Auslegeschrift No. 1,273,123, with boron, as disclosed in U.S. Pat. No. 3,391,123 and German Auslegeschrift No. 1,469,127, or with aluminum, as disclosed in German Offenlegungschrift No. 1,545,039, with hydrolytic dissociation subsequently being feasible at these weak spots. In this process too there is difficulty in reproducing the results. It is furthermore necessary to operate in entirely non-aqueous manner up to the time of hydrolytic dissociation and it is generally known that this will cause particular difficulties.

Thus, the known processes are not satisfactory in every respect.

SUMMARY OF THE INVENTION

Having in mind the limitations of the prior art, it is an object of the present invention to develop an improved process for the manufacture of low pilling polyester fibers and yarns and of the fabrics and knits made from them, which process would avoid the drawbacks of the prior art processes.

This object of the present invention is achieved by providing a polyester having dispersed therein a vinyl copolymer having two carboxyl and/or hydroxyl groups for providing branching components into the polyesters. The vinyl copolymer is added in amounts of 0.005 to 2.0 percent by weight, preferably from 0.05 to 1.0 percent by weight, referred to the dicarboxylic acid component. The vinyl copolymer has the following general formula

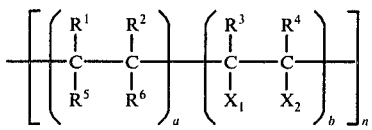

wherein:

$n$ is an integer from 10 to 10,000;

$a$ is an integer from 1 to 100, or zero;

$b$ is an integer from 1 to 100;

$R_1$ through $R_6$ is hydrogen, an alkyl group with 1 to 3 carbon atoms, or an oxalkyl group $OR^7$;

$R^7$ is an alkyl group with 1 to 6 carbon atoms, or an aryl group with 6 to 10 carbon atoms;

$X_1$ is hydrogen, an alkyl group with 1 to 3 carbon atoms, a carboxyl group, or an esterified carboxyl group; and $X_2$ is a carboxyl group, a hydroxyl group, an esterified carboxyl group or an esterified hydroxyl group.

Specific examples of the vinyl copolymers useful in the present invention include: methanol esterified ethylene-maleic acid (1:1) copolymer having a MW of about 20,000; methanol esterified styrene-maleic acid (1:1) copolymer having a MW of about 50,000; methanol esterified methylvinylethermaleic acid (1:1) copolymer having a MW of about 40,000; ethylenevinylacetate copolymer having a MW of about 250,000.

A polyester suitable for the process of the present invention consists, aside from containing the branching component of the invention, wholly or predominantly of polyethylene terephthalate. The polyethylene terephthalate may be modified to the extent of 15 mole percent with other dicarboxylic acids such as isophthalic acid, phthalic acid, diphenyldicarboxylic acid, 4,4'-sulfonyldibenzoic acid, 1,4-cyclohexanedicarboxylic acid, 1,5- or 2,6-naphthalinedicarboxylic acid, adipic acid, sebacic acid, decanoicdicarboxylic acid-(1.10) and or other diols such as 1,4- or 1,3-dimethylolcyclohexane, 1,3-propanediol, neopentylglycol, 1,4-butanediol, 1,6-hexanediol or 3,3,5-trimethyl-1,6-hexanediol.

The modifying components of the present invention, for which preferably $n$ is an integer from 10 to 1,000 and $b$ is preferably unity, possess molecular weights from 1,000 to 1,000,000, preferably from 2,000 to 100,000.

Thus, the advance of the present invention over the prior art consists in building polyfunctional polymerous to high polymerous compounds with at least ten carboxyl and/or hydroxyl groups as branching components into the polyesters. Preferably the polymerous carboxylic acids and alcohols of the invention are used in the form of ordinary derivatives, for instance methyl or ethyl esters or acetates or propionates. However, free acids or alcohols also may be used.

General examples of the polymerous branching means of the present invention and corresponding to the general formula are: ethylene maleic acid copolymers; styrene maleic acid copolymers, ethylene acrylic acid copolymers; ethylene methacrylic acid copolymers; polymethylacrylate; polymethylmethacrylate; alkyl-(methyl to hexyl-)-vinyl ether-maleic acid copolymers; polyvinyl alcohol; and ethylene-vinyl alcohol copolymers. The preparation of these copolymers is not an object of the present invention but is disclosed in the "Encyclopedia of Polymer Science and Technology".

The polymerous branching means of the present invention are added in amounts of about 0.005 to 2.0 percent by weight, preferably from about 0.05 to 1.0 percent by weight, referred to the dicarboxylic acid component, to the reaction mixture and generally prior to the ordinary ester interchange reaction. On the one hand, this is between the lower ester of the dicarboxylic acid, for instance terephthalic acid dimethylester, and on the other hand, the glycol, for instance ethyleneglycol. However, the addition may also take place at any other time during the ester interchange, up to the start of polycondensation, that is, up to the inactivation of the ester interchange catalyst.

If on the other hand a free polymerous carboxylic acid or a free polymerous alcohol is used as the branching component, the addition is feasible as late as the end of the polycondensation.

The preparation of the polyesters takes place in conventional manner, as disclosed in U.S. Pat. Nos. 2,465,319 and 3,391,123, in the presence of such ester interchange catalysts as salts of calcium, zinc or manganese, preferably acetates, and in the presence of such polycondensation catalysts as compounds of antimony, germanium or gallium.

In order to inactivate the ester interchange catalysts, phosphorus (III)-(V) compounds may be added. Suitable phosphorus compounds are the conventional ones such as phosphorus acid, phosphoric acid or organic phosphites or phosphates with alkyl or aryl groups, for instance triphenylphosphite, tris-p-nonylphenylphosphite, tri-n-butylphosphate or triphenylphosphate.

Further additives to the reaction mixture may be the conventional heat and oxidation stabilizers such as sterically hindered phenols or secondary aromatic amines, also such pigmentation means as titanium dioxide is used.

The polyesters obtained have solution viscosities between 0.2 and 0.8, preferably between 0.35 and 0.55 dl/gm and may be melt spun in conventional manner.

The branching components of the present invention have the great advantage of being present in only minute molecular proportions for a given weight as compared with the known monomerous compounds, for instance glycerin, pentacrythrite or pyromellitic acid. It is generally known that addition of a co-component will reduce the melting point and other desirable fiber properties such as the glass transition point and the hydrolysis stability of the homopolyester. This decrease in the melting point depends not only on the weight proportion of the modifying component, but also on its molecular proportion:

$$1/T_m - 1/T°_m = -(R/H_u)\ln X_A,$$

where $T_m$ is the copolyester melting point, $T°_m$ and $H_u$ are respectively the melting point and the heat of fusion of the homopolyester, $X_A$ the molecular fraction of the crystallizing building block, as disclosed by P. J. Flory, J. Chem. Phys. 17, 223, 1949, and R. Hill, "Fasern aus synthetischen Polymeren (Fibers from synthetic polymers)" — translated by H. Sippel, Stuttgart, 1956, page 327.

The great advantage of the polyesters improved by the present invention and in the process required for the preparation thereof consists on the one hand in the required polymerous branching components being low priced products manufactured on a large scale, and on the other hand, as already emphatically stressed, in that the other properties of the polyester are not significantly altered.

The pilling behavior of the yarns from the polyesters of the present invention is suitably determined by the wire kink rupture coefficient [hereafter abbreviated as DKZ are obtained with the wire kinking abrasion instrument of K. H. Gruenewald, Chemie-fasern 12, 853 (1962)].

DESCRIPTION OF THE PREFERRED EMBODIMENTS

The following examples serve to explain the present invention without however restricting it thereby.

EXAMPLE 1

The following ingredients are placed into an ester interchange reactor holding 100 liters and provided with a stirrer, a double jacket and a fractioning column:
 38.8 kg of dimethylterephthalate;
 0.145 kg of a methanol esterified ethylene-maleic acid (1:1) copolymer having a molecular weight of about 20,000;
 24.8 kg ethyleneglycol;
 0.0388 kg calcium acetate.

The mixture is heated and methanol starts distilling off at about 150° C. After methanol dissociation has ceased at 200° C, which generally will be the case no later than after three hours, the ester interchange product is fed into the polycondensation reactor of the same capacity. Then one adds
 0.0388 kg triphenylphosphate; and
 0.0116 kg of antimony trioxide.

Then the temperature is continuously raised to 280° C, while the pressure is gradually lowered to about 0.1 torr (torr = 1 mm $H_g$). Polycondensation is stopped when power absorption while stirring the reactor contents corresponds to a melt viscosity of about 500 – 800 poises at 285° C.

The polyester melt thereupon is extruded in the form of thin strands through the bottom of the reactor, where the strands are cooled in cold water, and they are then cut into small cylinders of about 5 mm length and 2–3 mm diameter.

The RSV values of the colorless polyesters (measured in phenol/tetrachloroethane 60/40 at 25° C) amounts to 0.48 dl/gm; the melting point (determined with the monoscope of Bock, Bad Oeynhausen, Germany) is 257° C. The melt viscosity (determined with a high pressure capillary viscosimeter of Zwick) is 540 poises at 285° C.

The material is extruded through a spinneret with 8 holes of 0.25 mm diameter at a spinning temperature of 307° C to obtain yarns which are wound at a speed of 640 meters/minute and which are then stretched at a ratio of 1:3.88.

The thread properties thereupon are as follows:
 titer: 44/8 dtex
 tear resistance: 2.1 p/dtex
 elongation: 39 percent Subsequently the DKZ is determined from 48 individual capillaries; the average value from these individual determinations is obtained as 270 lifts.

Yarns prepared in similar manner but without the addition of the methanol esterified ethylene maleic acid (1:1) copolymer, and of the following properties:
 RSV: 0.60 dl/gm
 melting point: 258° C
 titer: 44/8 dtex
 tear resistance: 35.7 percent show a DKZ of 2,250 lifts.

Polyethyleneterephthalate with the following properties:
 RSV: 0.48 dl/gm
 melting point: 256° C
which does not contain the ethylene maleic acid (1:1) copolymer, no longer may be spun under the same conditions because of the low viscosity of the melt.

EXAMPLE 2

Corresponding to Example 1, a polyester with the following ingredients is prepared:
 38.8 kg dimethylterephthalate;
 0.155 kg of a methanol esterified styrene-maleic acid (1:1) copolymer (molecular weight about 50,000);
 24.8 kg ethylene glycol;
 0.0149 kg zinc acetate (non-aqueous).

Following ester interchange, and per Example 1, the following are added:
 0.0194 kg triphenylphosphate; and
 0.0116 kg antimony oxide The melting point of the polyester is 261° C and the RSV is 0.45 dl/gm. It may be spun easily and the DKZ of the yarns is 340 lifts.

EXAMPLE 3

The branching component used in Example 2 is replaced by 0.0775 kg of a methanol esterified methylvinylether-maleic acid (1:1) copolymer of approximate molecular weight of 40,000.

The melting point of the polyester obtained is 259° C and its RSV is 0.42 dl/gm. It may be spun easily. Yarn testing provides the following values:
 titer: 44/8 dtex;
 elongation: 34 percent
 tear resistance: 1.9 p/dtex;
 DKZ: 370 lifts.

EXAMPLE 4

In lieu of the branching component used in Example 2, 0.1164 kg of a commercially available ethylene-vinylacetate-copolymer (Levapren) of approximately molecular weight of 250,000 is used. The melting point of the resulting polyester is 261° C and its RSV is 0.43 dl/gm. It may be easily spun. Yarn testing provides the following results:
 titer: 44/8 dtex;
 elongation: 36 percent;
 tear resistance: 2.0 p/dtex;
 DKZ: 400 lifts.

EXAMPLE 5

0.097 kg of a polymethylacrylate of approximate molecular weight of 150,000 is used as the branching component in the reaction mixture of Example 2. The properties of the resulting polyester are as follows:
 RSV: 0.44 dl/gm;
 boiling point: 259° C.

This polyester is very easily spun. Yarn tests provide the following results:
 titer: 44/8 dtex;
 elongation: 34.5 percent
 tear resistance: 2.3 p/dtex
 DKZ: 390 lifts.

We claim:

1. An improvement in the process of melt spinning ethylene terephthalate polyester to produce textile fibers having substantially decreased pilling in fabrics containing the fibers comprising melt polymerizing ethylene terephthalate in the presence of a condensation catalyst to a final temperature of about 250° to 300° C and a final pressure of less than 10 mm of mercury to form an anhydrous melt, the improvement comprising:
conducting said melt polymerizing in the presence of about 0.005 to 2.0 percent by weight, with respect to the dicarboxylic acid component of a substance having the general formula:

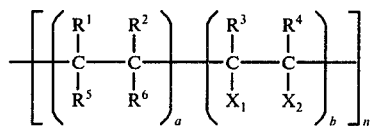

where:

$n$ is an integer from 10 to 10,000;

$a$ is zero or an integer from 1 to 100;

$b$ is an integer from 1 to 100;

$R^1$ through $R^6$ are hydrogen, an alkyl group with 1 to 3 carbon atoms or an oxalykyl group $-OR^7$;

$R_7$ is an alkyl group with 1 to 6 carbon atoms or an aryl group with 6 to 10 carbon atoms;

$X_1$ is hydrogen, an alkyl group with 1 to 3 carbon atoms, a carboxyl group, or an esterified carboxyl group; and $X_2$ is a carboxyl group, a hydroxyl group, an esterified carboxyl group or an esterified hydroxyl group;

building polymerous compounds selected from the group consisting of at least ten carboxyl and hydroxyl groups or at least ten hydroxyl groups as branching components in said polyester; and melt spinning said anhydrous melt.

2. The process of claim 1, wherein said compound having the general formula has a concentration of about 0.05 to 1.0 percent by weight.

3. The product obtained by the process of claim 1.